Aug. 10, 1937.  H. E. MEILSTRUP  2,089,396
METHOD OF MAKING A FOOD PRODUCT
Filed April 22, 1936
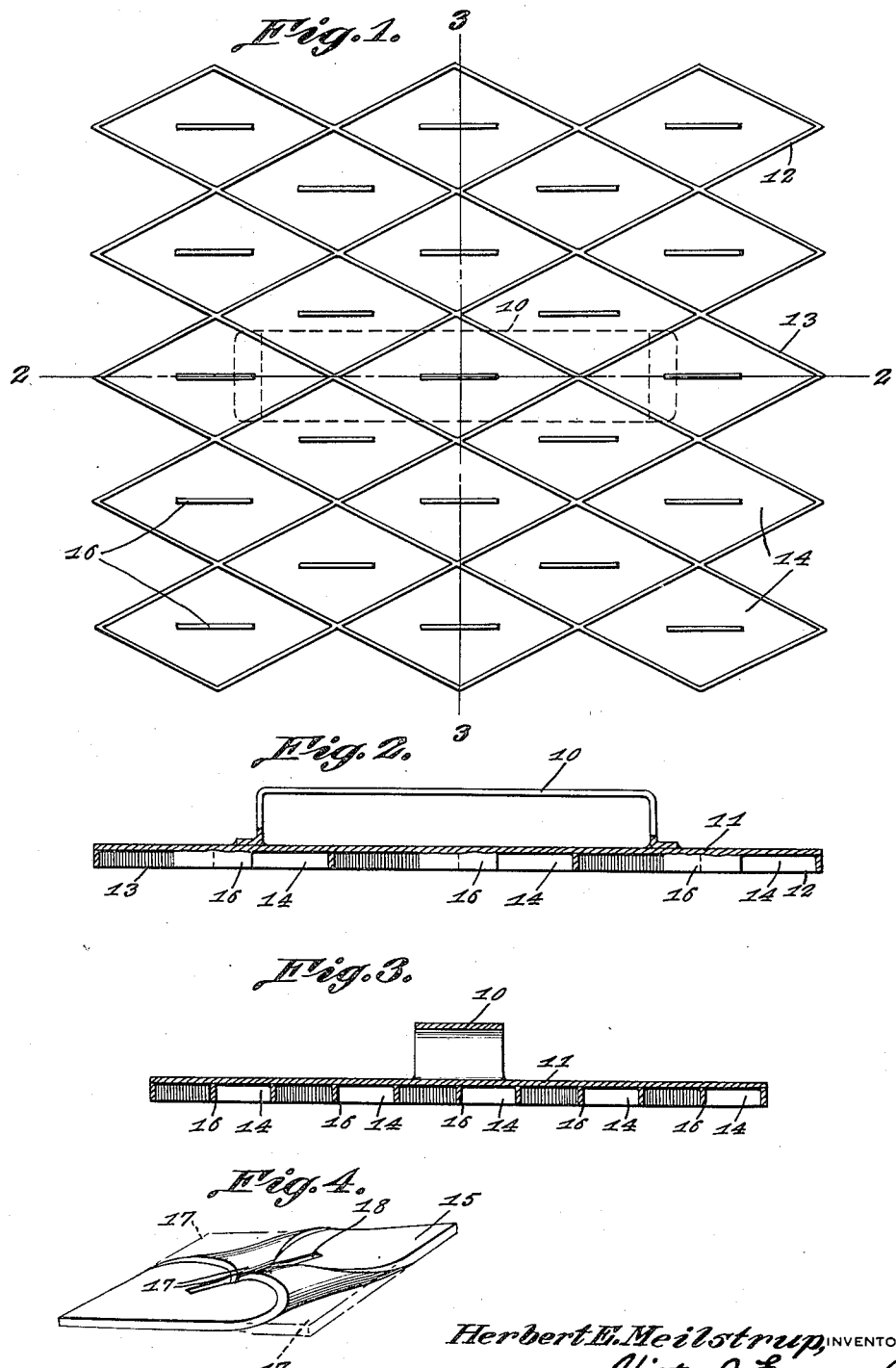
Herbert E. Meilstrup, INVENTOR
BY Victor J. Evans & Co.
ATTORNEY Patented Aug. 10, 1937

2,089,396

UNITED STATES PATENT OFFICE 2,089,396

METHOD OF MAKING A FOOD PRODUCT

Herbert E. Meilstrup, Los Angeles, Calif.

Application April 22, 1936, Serial No. 75,825

1 Claim. (Cl. 107—54)

The invention relates to a method of making a food product and more especially doughnuts.

An object of the invention is to provide a method of making a new food product consisting in cutting and folding dough substance or material into fanciful configuration with resultant neat and attractive form to the product when baked or cooked.

Another object of the invention is to provide a method of making a food product consisting in cutting and shaping or folding dough material for effecting a definite and fanciful shape thereto and at the same time enabling all surfaces to be baked and thus avoiding staleness in the finished product.

In the accompanying drawing:

Figure 1 is a bottom plan view of the cutter constructed in accordance with the invention.

Figure 2 is a sectional view on the line 2—2 of Figure 1.

Figure 3 is a sectional view on the line 3—3 of Figure 1.

Figure 4 is a perspective view showing a finished product cut by the device and subsequently shaped into permanent form.

Similar reference characters indicate corresponding parts throughout the several views in the drawing.

Referring to the drawing in detail, the device comprises a loop handle 10 made fast to a flat plate-like deck 11 preferably at the center of the latter and from the working side of this deck project series of cutting blades 12 and 13, respectively. The blades of each series are arranged in spaced parallel relation to each other and diagonally disposed, that is the blades of one series being reversed to the blades of the other series so that these blades criss-cross each other and are united at their inner sections with one another so as to provide preferably diamond shaped cavities 14 walled on all sides of each by the blades whereby in the use of the device corresponding shaped sections of dough 15 can be cut by the blades from a strip or sheet of dough material for the formation of doughnuts. It is, of course, understood that the shape of the cavities 14 can be varied in conformity with the particular configuration of article desired, although it is preferable to have the article of diamond shape in the finished product.

Located at the longitudinal center of each cavity 14 is a short length straight cutter 16 which functions to provide a slot in the section of dough 15 when cut by the device so that opposite corners 17 of this section 15 can be rolled inwardly and tucked within the slit or slot 18 provided therein by the cutter 16. In this manner the finished product will have the appearance as is clearly shown in Figure 4 of the drawing by full lines while the dotted lines are indicative of the section of dough cut by the device prior to the rolling thereof at the opposite corners 17 of the same. Now by producing an article from dough of the character just referred to all surfaces of the dough will be exposed to permit thorough baking of such article and also preserving it to avoid staleness resultant from the baking of the exposed surfaces of such article.

What is claimed is:

A method of making a doughnut consisting in cutting a piece of dough into shape and slotting the same within its border and then turning the piece on itself at opposite points and training the turned portions into said slots for exposing to a frying agent a maximum amount of surface of said piece.

HERBERT E. MEILSTRUP.